United States Patent
de Zeeuw et al.

(10) Patent No.: US 12,031,004 B2
(45) Date of Patent: Jul. 9, 2024

(54) WATER BASED DISPERSION TO MAKE COATINGS WITH INCREASED MVTR BARRIER PROPERTIES

(71) Applicant: Henkel AG & Co. KGaA, Duesseldorf (DE)

(72) Inventors: Ard de Zeeuw, Duesseldorf (DE); Maria Tomé Jorge, Duesseldorf (DE); Robin Leif Krug, Solingen (DE); Thomas Moeller, Duesseldorf (DE); Juergen Stodt, Neuss (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 356 days.

(21) Appl. No.: 17/343,868

(22) Filed: Jun. 10, 2021

(65) Prior Publication Data

US 2021/0292504 A1   Sep. 23, 2021

Related U.S. Application Data

(63) Continuation of application No. PCT/EP2019/083248, filed on Dec. 2, 2019.

(30) Foreign Application Priority Data

Dec. 14, 2018 (EP) ................... 18212594

(51) Int. Cl.
| | | |
|---|---|---|
| C08J 7/048 | (2020.01) | |
| C08J 7/043 | (2020.01) | |
| C08J 7/052 | (2020.01) | |
| C09D 125/02 | (2006.01) | |

(52) U.S. Cl.
CPC ............... *C08J 7/048* (2020.01); *C08J 7/043* (2020.01); *C08J 7/052* (2020.01); *C09D 125/02* (2013.01); *C08J 2325/02* (2013.01)

(58) Field of Classification Search
CPC C08J 2323/12; C08J 2325/02; C08J 2345/00; C08J 2367/02; C08J 2445/00; C08J 2467/02; C08J 2467/04; C08J 3/05; C08J 3/07; C08J 7/0427; C08J 7/043; C08J 7/048; C08J 7/052; C08L 23/0869; C09D 125/02; C09D 145/00
See application file for complete search history.

(56) References Cited

U.S. PATENT DOCUMENTS

| | | |
|---|---|---|
| 7,801,778 B2 | 9/2010 | Fox |
| 8,618,210 B2 | 12/2013 | Moncla et al. |
| 2006/0289853 A1* | 12/2006 | Chen ............ B82Y 10/00 257/14 |
| 2018/0319974 A1 | 11/2018 | Smit et al. |

FOREIGN PATENT DOCUMENTS

| | | |
|---|---|---|
| CN | 1643099 A | 7/2005 |
| CN | 101198415 A | 6/2008 |
| CN | 102414258 A | 4/2012 |
| CN | 102585376 A | 7/2012 |
| DE | 19859191 A1 | 6/2000 |
| EP | 1899432 B1 | 6/2015 |
| JP | S46029274 B1 | 8/1971 |
| JP | H08176356 A | 7/1996 |
| JP | 2000327878 A | 11/2000 |
| JP | 2007217651 A | 8/2007 |
| JP | 2018115320 A | 7/2018 |
| WO | 0047685 A1 | 8/2000 |
| WO | 2005085331 A1 | 9/2005 |
| WO | 2007008558 A2 | 1/2007 |
| WO | 20080033343 A2 | 3/2008 |

OTHER PUBLICATIONS

International Search Report for PCT/EP2019/083248 mailed Jan. 8, 2020.

* cited by examiner

*Primary Examiner* — Lawrence D Ferguson
(74) *Attorney, Agent, or Firm* — Mary K. Cameron

(57) ABSTRACT

The present invention relates to an aqueous dispersion, comprising or consisting of A) at least one cyclic olefin copolymer, B) at least one surfactant; optionally C) at least one adhesion promoter; optionally D) at least one film-forming resin; optionally E) at least one additive; and F) water. Additionally, the invention relates to methods of manufacturing the aqueous dispersion, to an article, which comprises at least one substrate and at least one coating layer obtained from the aqueous dispersion and applied onto the substrate; and to methods of improving MVTR of a substrate.

14 Claims, No Drawings

WATER BASED DISPERSION TO MAKE COATINGS WITH INCREASED MVTR BARRIER PROPERTIES

The present invention relates to an aqueous dispersion, comprising or consisting of A) at least one cyclic olefin copolymer, B) at least one surfactant; optionally C) at least one adhesion promoter; optionally D) at least one film-forming resin; optionally E) at least one additive; and F) water. Additionally, the invention relates to methods of manufacturing the aqueous dispersion, to an article, which comprises at least one substrate and at least one coating layer obtained from the aqueous dispersion and applied onto the substrate; and to the use of the aqueous dispersion for coating a substrate.

Polymer-based packaging systems, for instance polyolefin films, are broadly used in packaging industry. Packaging is used to protect the filling good, for example food, against environmental influences. Migrating gases such as $CO_2$, $O_2$, flavor compounds or moisture are such environmental compounds, which need to be balanced, since they can alter the original properties of the product before arriving to its final use. For example, dry filling goods need to be preserved from humidity. From this perspective, the packaging needs to provide moisture barrier properties from outside the packaging and vice versa.

The industry is using several concepts to provide extended barrier properties. For instance, olefin films, such as polyethylene terephthalate (PET), polyethylene (PE), or oriented polypropylene (OPP), are coated with polyvinylidene chloride (PVDC) in order to increase the gas barrier, especially against $O_2$ and moisture. Because of the presence of chloride, this technology is of concern for environmental reasons.

An alternative approach is to cast multi-layer films. However, the technology of casted multi-layer films is complex and cost intensive from the production side. Additionally, recycling of this material can be challenging.

A further alternative approach is deposition of a barrier film by vapor deposition. However, the technique of physical vapor deposition relates to a complex production process. Chemical vapor deposition coatings have good barrier properties, but they are sensitive against mechanical stress. Therefore, protective coatings need to be applied, which also increase the costs and more time-consuming process steps. Additionally, the coating often does not fulfil the desired aesthetic requirements. For example, $AlO_x$ coatings are not transparent, rather metallic.

Although a large number of processes for coating substrates already exist, all processes have one or more disadvantages. Therefore, there is a need for improved, preferably transparent, packaging solutions with good gas barrier and moisture barrier properties.

In general, aqueous dispersions of polymers and copolymers for coating applications are commonly preferred, since their handling is easier, they are less inflammable and less health damaging, in comparison to organic solvent-based mixtures and the above-mentioned processes. Furthermore, in case organic solvent-based mixtures are used, the solvent may influence the properties of the resulting coating, which is not desired.

A method for preparing an aqueous polyalkenamer dispersion by ring-opening metathesis- polymerization of at least one low water-soluble cyclic olefin a), optionally further cyclic and/or acyclic olefins b), in the presence of at least one metathesis catalyst c), and at least one surface-active substance d), and optionally further additives e) characterized in that the dispersion is prepared by mini-emulsion polymerization is disclosed in DE 198 59 191 A1.

Although there are already processes for the production of aqueous dispersions, mixing of homopolymers and copolymers with water to achieve stable solutions or dispersions is rather challenging, and there is a need for novel methods to manufacture aqueous dispersions of homopolymers or copolymers, which provide transparent coatings for packaging systems with good gas barrier and moisture barrier properties, without using metallocene catalysts or open-ring polymerization, which modify the structure of the polymers in an undesired way.

Surprisingly, the present inventors found that the problem can be solved by a novel aqueous dispersion comprising at least one cyclic olefin copolymer, at least one surfactant, and water. The aqueous dispersion can be provided without using (metallocene) catalysts or ring-opening polymerization. Optionally, the aqueous dispersion contains at least one adhesion promoter, and/or at least one film-forming resin, and/or at least one additive. The at least one adhesion promoter can be a polyester resin, for instance. Thereby, the adhesion of the resulting coating to polyolefin substrates and the gas barrier properties are further improved without altering the moisture barrier properties, in comparison to coatings of cyclic olefin copolymers, which are applied without being dispersed in water.

Therefore, the present invention relates in a first aspect to an aqueous solution comprising or consisting of A) at least one cyclic olefin copolymer, B) at least one surfactant; optionally C) at least one adhesion promoter; optionally D) at least one film-forming resin; optionally E) at least one additive; and F) water.

In a second aspect, a method of manufacturing an aqueous dispersion is provided, wherein the method comprising or consisting of the steps:

(i) dissolving A), the at least one cyclic olefin copolymer in a suitable solvent, and optionally adding B), the at least one surfactant, and/or optionally C), the at least one adhesion promoter, and/or optionally D), the at least one film forming resin, and/or optionally E), the at least one additive;

(ii) optionally mixing an aqueous phase with B), the at least one surfactant, if B) has not been added in step (i);

(iii) mixing the solution of step (i) and the aqueous phase, which optionally contains B), the at least one surfactant, if B) has not been added in step (i), under high shear; and (iv) condensing the used solvents.

In a third aspect, a method of manufacturing an aqueous dispersion is provided, wherein the method comprises or consists of the steps:

(i) feeding an extruder with A), the at least one cyclic olefin copolymer, optionally with B), the at least one surfactant, and/or optionally with C), the at least one adhesion promoter, and/or optionally with D) the at least one film forming resin, and/or optionally with E), the at least one additive;

(ii) adding water, which is optionally mixed with B), the at least one surfactant, if B) has not been added in step (i) and/or optionally with C), the at least one adhesion promoter, if C) is present and has not been added in step (i) and/or optionally with D), the at least one film forming resin, if D) is present and has not been added in step (i), and/or optionally with (E) the at least one additive, if E) is present and has not been added in step (i), into the extruder; and (iii) diverting the aqueous dispersion resulting from step (ii) from the extruder.

In a fourth aspect, a method of manufacturing an aqueous dispersion is provided, wherein the method comprises or consists of the steps:
(i) melting A), the at least one cyclic olefin copolymer, B), the at least one surfactant, optionally C), the at least one adhesion promoter, and/or optionally D) the at least one film forming resin, and/or optionally E), the at least one additive;
(ii) transferring the mixture of step (i) in a reaction chamber;
(iii) simultaneously with step (ii) transferring water having a temperature above 100 ° C. in the reaction chamber;
(iv) delivering the mixture of step (ii) and the water of step (iii) simultaneously into a carrier gas, e.g. $N_2$, $H_2$ or argon, in the reaction chamber;
(v) diverting the mixture resulting from step (iv) from the reaction chamber.

Furthermore, an article, which comprises at least one substrate and at least one coating layer is provided in a fifth aspect, wherein the article is obtainable by applying the aqueous dispersion according to the invention onto the substrate; and then drying the article, whereby the coating layer is obtained. Finally, in a sixth aspect, use of the aqueous dispersion according to the invention for coating a substrate, is provided.

"One or more", as used herein, relates to "at least one" and comprises 1, 2, 3, 4, 5, 6, 7, 8, 9 or more of the referenced species. Similarly, "at least one" means "one or more", i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules. For example, "at least one cyclic polyolefin copolymer" means that at least one type of copolymer falling within the definition can be part of the aqueous dispersion, but that also two or more different copolymer types falling within this definition can be present.

Numeric values specified without decimal places refer to the full value specified with one decimal place. For example, "99%" means "99.0%", if not stated otherwise.

The expressions "approx." or "about", in conjunction with a numerical value, refer to a variance of ±10% relative to the given numerical value, preferably ±5%, more preferably ±1%, if not explicitly stated otherwise.

All percentages given herein in relation to the aqueous dispersion or to the solid content of the aqueous dispersion relate to weight % (wt.-%) relative to the total weight of the respective aqueous dispersion or the solid content of the aqueous dispersion, if not explicitly stated otherwise.

As used herein, the term "homopolymer" means polymers prepared from a single monomer species. The term "copolymer" means polymers prepared from at least two monomer species.

The terms "surfactant", "emulsifier" and "emulsifying agent" are interchangeably used in this application.

The term "additive" can be any commonly component or compound, which is added to the aqueous solution by a person skilled in the field of aqueous dispersions, to achieve certain characteristics of the aqueous dispersion. Furthermore, according to the invention the term encompasses minor amounts, preferably less than 1 wt.-%, more preferably less than 0.1 wt.-%, most preferably below 0.01 wt.-% of optional impurities and/or reaction or side products, which can be formed in the aqueous dispersion.

These and other aspects, features and advantages of the invention become apparent to the skilled person in the following detailed description and claims. Each feature from one aspect of the invention can be used in any other aspect of the invention. Additionally, each feature from one embodiment can be combined with every other feature from another embodiment, if not explicitly stated otherwise. Furthermore, the examples contained herein are intended to describe and illustrate the invention, but do not restrict it and in particular, the invention is not limited to these examples.

According to the invention, the aqueous dispersion comprises or consists of A) at least one cyclic olefin copolymer, B) at least one surfactant; optionally C) at least one adhesion promoter; optionally D) at least one film-forming resin; optionally E) at least one additive; and F) water.

In a preferred embodiment, the aqueous dispersion comprises A) at least one cyclic olefin copolymer, wherein the at least one cyclic olefin copolymer
i) is obtained by copolymerizing a C5 to C12 cycloalkene and at least one C2 to C10 alkylene, preferably norbornene and at least one of ethylene, propylene, butylene, hexylene and octylene, more preferably norbornene and ethylene; and/or
ii) has a glass transition temperature Tg of 6 to 138 ° C., preferably 33 to 78 ° C., most preferably 65 ° C., measured according to DIN EN ISO 11357-1:2017-02, -2:2014-07, or -3:2018-07; and/or
iii) has a density of 905 to 1200 kg/m$^3$ , preferably 1000 to 1050 kg/m$^3$ , measured according to DIN EN ISO 1183-1:2013-04; and/or
iv) has a tensile modulus in machine direction of 1500 to 2500 MPa, preferably 1600 to 1800 MPa, measured according to DIN EN ISO 527-3:2003-07; and/or
v) has a strength at break in machine direction of 40 to 70 MPa, preferably 50 to 60 MPa, measured according to DIN EN ISO 527-3:2003-07; and/or
vi) has an elongation at break in machine direction of 2.0 to 4.0%, preferably 2.3 to 3.6%, measured according to DIN EN ISO 527-3:2003-07; and/or
vii) has a melt flow rate at 230° C., 2.16 kg load of 0.5 to 15.0 g/10 min, preferably 3.5 to 9.5 g/10 min; and/or
viii) is present in 5 to 99 wt.-%, preferably 50 to 95 wt.-%, based on the solid content of the aqueous dispersion; and/or
ix) in the aqueous dispersion have an average particle size as a D50 value of 50 to 500 nm, preferably of 200 to 300 nm, measured via dynamic light scattering.

In a preferred embodiment, the at least one cyclic olefin copolymer is obtained by copolymerizing a C5 to C12 cycloalkene and at least one C2 to C10 alkylene, preferably norbornene and at least one of ethylene, propylene, butylene, hexylene and octylene, more preferably norbornene and ethylene, in the presence of at least one metallocene catalyst. The obtained copolymer, which is employed in the present invention is essentially free of metallocene catalyst, preferably contains the metallocene catalyst in less than 0.001 wt.-% based on the total weight of the copolymer, more preferably in less than 0.000001 wt.-% based on the total weight of the copolymer, most preferably is free from the metallocene catalyst.

In another preferred embodiment, the at least one cyclic olefin copolymer is obtained by chain copolymerization of C5 to C12 cycloalkene and at least one C2 to C10 alkylene, preferably norbornene and at least one of ethylene, propylene, butylene, hexylene and octylene, more preferably norbornene and ethylene. The composition of the copolymer preferably depends on the relative concentration of the single monomers in the copolymerization mixture.

By using an increased norbornene content in the cyclic olefin copolymer, the heat resistance of the resulting coating layer increases.

In a preferred embodiment the aqueous dispersion is essentially free of metallocene catalyst and/or metathesis catalyst, preferably contains them in less than 0.0001 wt.-%, more preferably in less than 0.0000001 wt.-%, most preferably is free from them, based on the total weight of the aqueous dispersion.

As used herein the term "Tg" refers to the glass transition temperature. The Tg can be determined in accordance with DIN EN ISO 11357-1:2017-02, -2:2014-07, or -3:2018-07. Glass transition temperature Tg is preferably determined by differential scanning calorimetry (DSC). Further general techniques for measuring Tg are thermal mechanical analysis (TMA) or dynamic mechanical analysis (DMA).

The D50 value indicates that 50% by volume of the dispersed polymeric ingredients of the can inner coating has a size less than the value given. Preferably, the D50 value can be determined from volume-weighted cumulative particle size distributions. The particle size distribution curve can be measured preferably with the help of corresponding dynamic light scatter methods, which are familiar to those skilled in the art. Preferably, in the context of this invention, the particle size is measured directly in the aqueous dispersion of this invention at a temperature of 20° C. provided that the solid matter content of the dispersion is adjusted to 1g/kg with deionized water ($\kappa$<1 $\mu Scm^{-1}$).

In a preferred embodiment, a colorless and/or transparent and/or translucent coating layer is obtained from the aqueous dispersion. Preferably, the transmittance of the colorless and/or transparent and/or translucent coating layer is >0.85 (>85%), more preferably >0.9 (>90%). The transmittance of the coating layer according to the invention is determined by applying the aqueous dispersion according to the invention onto a reference material. The transmittance of the reference material alone without the coating layer according to the invention, serves as a background control and the determined transmittance value will be subtracted from the transmittance of the coated reference material. Preferably, transmittance is determined by UV-Vis-spectrophotometry with a streaking incidence of light with an angle of 0° and with a wavelength of 390 to 700 nm. As a reference material, a transparent, biaxial, coextruded polyethyleneterephthalate film can be used, which is commercially available under the trade name "Hostaphan RNK" from Mitsubishi.

The moisture vapor transmission rate (MVTR) is a measure of the passage of water vapor through a substance or coating layer, measured according to DIN EN ISO 15106-3:2005-05.

Preferably, the oxygen permeability of the coating layer obtainable by the aqueous dispersion according to the invention at 23 ° C. and 50% RH is in the range of 150 to 300 $cm^3/(m^2 \cdot day \cdot bar)$, more preferably 160 to 200 $cm^3/(m^2 \cdot day \cdot bar)$ measured by ASTM D3985-17.

In a further preferred embodiment, (i) the coating thickness of the coating layer obtainable by the aqueous dispersion according to the invention is 0.1 to 15 $g/m^2$, preferably 5 to 10 $g/m^2$, more preferably 7 to 9.5 $g/m^2$; and/or ii) the coating layer has a MVTR of 7 to 60 $g/(m^2 \cdot day)$, preferably 12 to 50 $g/(m^2 \cdot day)$ at 38° C. and 90% RH.

Suitable cyclic olefin copolymers are commercially available from TOPAS Advances Polymers GmbH, Frankfurt, Germany under the trade names TOPAS 9506F-500 (Tg 65° C.), TOPAS 8007F-600 (Tg 78° C.), TOPAS 7010E-600 (Tg 110° C.), TOPAS 6013F-04 (Tg 138° C.), TOPAS 9903D-10 (Tg 33° C.), TOPAS 8007F-04 (Tg 78° C.), TOPAS 5013F-04 (Tg 136° C.), or TOPAS E-140 (Tg 6° C.). Preferably, they are amorphous thermoplastics and/or their rigidity is maintained until about 10° C. below Tg.

In a preferred embodiment, TOPAS 9506F-500 (Tg 65° C.), a cyclic olefin copolymer copolymerized from norbornene and ethylene, is used for manufacturing the aqueous dispersion according to the invention.

According to the invention, the at least one cyclic olefin copolymer A) is different from the compounds of component B), and the optional components C), D), and E) of the aqueous dispersion.

The aqueous dispersion further comprises B) at least one surfactant, preferably to stabilize the aqueous dispersion.

In a preferred embodiment, i) the at least one surfactant is an anionic or non-ionic surfactant or a mixture thereof; and/or ii) the at least one surfactant comprises an alkyl sulfate, preferably a fatty alcohol alkyl sulfate, more preferably sodium lauryl sulfate; and/or iii) the at least one surfactant comprises a fatty alcohol alkoxylate, preferably a linear C12-18 fatty alcohol alkoxylate, more preferably a linear C16-18 alcohol ethoxylate with 10 to 15 ethoxy units; and/or iv) the at least one surfactant comprises a copolymer obtained by reacting at least one olefinic monomer, preferably selected from ethylene, propene, 1-butene, 2-butene, isobutene, 1,3-butadiene and 2-methylbuta-1,3-diene with at least one comonomer selected from $\alpha,\beta$-unsaturated carboxylic acids, preferably cinnamic acid, crotonic acid, fumaric acid, itaconic acid, maleic acid, acrylic acid and methacrylic acid; wherein the obtained copolymer preferably has an acid value of at least 60 mg KOH/g more preferably below 200 mg KOH/g, more preferably below 100 mg KOH/g; and/or v) wherein the at least one surfactant is present in 0.01 to 10 wt.-%, preferably 2 to 7 wt.-%, based on the solid content of the aqueous dispersion.

The acid number is a characteristic number, which needs to be determined experimentally according to the invention and is a measure of the number of free acid groups in the copolymer or in the copolymer blend. Preferably, the acid number is determined by dissolving a weighed amount of the reference material in a solvent mixture of methanol and distilled water in a volume ratio of 3:1 and then titrating potentiometrically with 0.05 mol/L KOH in methanol. Preferably, the potentiometric measurement is performed using a combination electrode (LL-Solvotrode® from Metrohm; reference electrolyte 0.4 mol/L tetraethyl ammonium bromide in ethylene glycol). The acid number, stated in this invention, corresponds to the amount of KOH added in milligrams per gram of copolymer and/or copolymer blend at the turning point in the potentiometric titration curve.

The acid value of the at least one surfactant is preferably at least 60 mg KOH/g, which improves the surface activity of the aqueous dispersion. Furthermore, the acid value of the at least one surfactant is preferably below 200 mg KOH/g, more preferably below 100 mg KOH/g, to improve compatibility with the cyclic olefin copolymer A).

Further preferred anionic surfactants can be selected from the group consisting of C8-18 alkylbenzene sulfonates, olefin sulfonates, C12-18 alkane sulfonates, ester sulfonates, alk(en)yl sulfates, fatty alcohol ether sulfates and mixtures thereof. Preferably, the anionic surfactant is selected from at least one C8-18 alkylbenzene sulfonate.

It is preferred that the aqueous dispersion according to the invention contains at least one anionic surfactant of formula (T1)

(T1)

where $R^1$ is a linear or branched, substituted or unsubstituted functional group, selected from alkyl, aryl or alkyl aryl functional groups, the group -A- is a chemical bond or a functional group $-(OZ)_n-O-$, where OZ is an ethylene oxide (EO) group or propylene oxide (PO) group and n is an integer from 1 to 50, preferably from 1 to 20, more preferably from 2 to 10, in particular 2, 3, 4, 5, 6, 7 or 8; and $Y^+$ is a monovalent cation or the n-th part of an n-valent cation.

Preferred are alkyl ether sulfates of formula (T1-1)

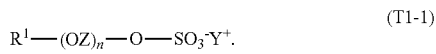
(T1-1)

In this formula (T1-1), $R^1$ is a linear or branched, substituted or unsubstituted alkyl functional group, preferably a linear, unsubstituted alkyl functional group, in particular a fatty alcohol functional group. Preferred functional groups $R^1$ are selected from decyl, undecyl, dodecyl, tridecyl, tetradecyl, pentadecyl, hexadecyl, heptadecyl, octadecyl, nonadecyl, eicosyl functional groups, from the before-mentioned compounds the ones having an even number of C atoms are preferred. Particularly preferred functional groups $R^1$ are derived from C12-C18 fatty alcohols, for example from coconut fatty alcohol, tallow fatty alcohol, lauryl, myristyl, cetyl or stearyl alcohol or from $C_{10}$-$C_{18}$ oxo alcohols. OZ, $Y^+$ and n are as previously specified in formula (T1).

In further preferred embodiments of formula (T1-1), OZ is an ethylene oxide (EO) group or propylene oxide (PO) group, preferably an ethylene oxide group, n is an integer from 1 to 50, preferably from 1 to 20, and in particular from 2 to 10, more preferred, n is 2, 3, 4, 5, 6, 7 or 8. According to formula (T1-1), $Y^+$ is a monovalent cation or the n-th part of an n-valent cation, in this case, the alkali metal ions including $Na^+$ or $K^+$ are preferred, with $Na^+$ being particularly preferred. Additional cations can be selected from $NH_4^+$, $½Zn^{2+}$, $½Mg^{2+}$, $½Ca^{2+}$, $½Mn^{2+}$, and mixtures thereof.

The aqueous dispersion may contain at least one alkyl ether sulfate selected from fatty alcohol ether sulfates of formula (T1-2),

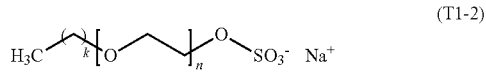
(T1-2)

wherein k=11 to 19, n=2, 3, 4, 5, 6, 7 or 8.

More preferred representatives are Na—C12-14 fatty alcohol ether sulfates with 2 EO (k=11-13, n=2). The degrees of ethoxylation indicated represent a statistical average that can correspond to an integer or a fractional number for a specific product. Preferred alkoxylates/ethoxylates have a narrowed homolog distribution (narrow range ethoxylates, NRE).

It is preferred for the aqueous dispersions according to the invention to contain at least one compound of formula (T1-1), (T1-2), (T1-3), (T1-3a) or mixtures thereof.

Compound (T1-3) has the following formula:

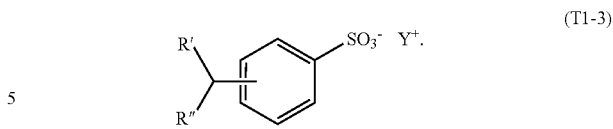
(T1-3)

Where R' and R", independently of each other, are H or alkyl, and together contain 9 to 19, preferably 9 to 15 and in particular 9 to 13 C atoms, and $Y^+$ indicates a monovalent cation or the n-th part of an n-valent cation, in particular $Na^+$.

A further preferred representative is described by formula (T1-3a):

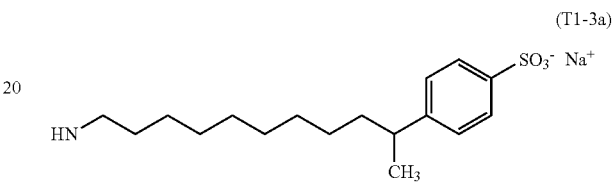
(T1-3a)

In a preferred embodiment, the at least one surfactant comprises an anionic or non-ionic surfactant or a mixture thereof; and/or the at least one surfactant comprises an alkyl sulfate, preferably a fatty alcohol alkyl sulfate, more preferably sodium lauryl sulfate. A suitable anionic surfactant is commercially available under the trade name Texapon K 12 P (0.3 wt.-%) from BASF, Mannheim, Germany.

The aqueous dispersion according to the invention may contain at least one non-ionic surfactant as the at least one surfactant. In a preferred embodiment, the aqueous dispersion according to the invention contains at least one non-ionic surfactant in addition to an anionic surfactant. Suitable additional non-ionic surfactants include alkoxylated fatty acid alkyl esters, alkoxylated fatty acid amides, hydroxylated alkyl glycol ethers, polyhydroxy fatty acid amides, alkylphenol polyglycol ethers, amine oxides, alkyl(poly) glucosides and mixtures thereof.

Particularly preferably, the agent according to the invention contains at least one compound of formula (T2) as a non-ionic surfactant:

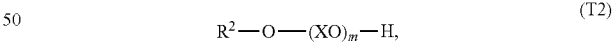
(T2)

in which
$R^2$ is a linear or branched $C_8$-$C_{18}$ alkyl functional group, an aryl functional group or an alkyl aryl functional group,
XO independently of each other is an ethylene oxide (EO) group or a propylene oxide (PO) group,
m is an integer from 1 to 50.

Preferably, functional groups $R^2$ of formula (T2) are derived from C12-C18 fatty alcohols, for example from coconut fatty alcohol, tallow fatty alcohol, lauryl, myristyl, cetyl or stearyl alcohol or from $C_8$-$C_{18}$ oxo alcohols. According to formula (T2), XO preferably is an ethylene oxide group. According to formula (T2), the index m preferably is a number from 1 to 20, and in particular from 2 to 10. Preferably, m is 2, 3, 4, 5, 6, 7 or 8.

Non-ionic surfactants that are preferably used are alkoxylated, more preferably ethoxylated, in particular primary alcohols with preferably 8 to 18 C atoms and, on average, 4 to 12 mols of ethylene oxide (EO) per mol of alcohol, in which the alcohol functional group can be linear or preferably methyl-branched in the 2 position, or it can contain linear and methyl-branched functional groups in admixture, as are usually present in oxo alcohol functional groups. However, alcohol ethoxylates having linear functional groups of alcohols of native origin having 12 to 18 C atoms, for example of coconut, palm, tallow fatty or oleyl alcohol, and an average of 4 to 8 EO per mole of alcohol are particularly preferred. Examples of preferred ethoxylated alcohols are C12-14 alcohols with 4 EO or 7 EO, C9-11 alcohols with 7 EO, C13-15 alcohols with 5 EO, 7 EO or 8 EO, C12-18 alcohols with 5 EO or 7 EO, and mixtures thereof. Preferred alcohol ethoxylates have a narrowed homolog distribution (narrow range ethoxylates, NRE). In addition to or instead of these preferred non-ionic surfactants, fatty alcohols with more than 12 EO can also be used. Examples of these are tallow fatty alcohols with 14 EO, 25 EO, 30 EO, or 40 EO. Non-ionic surfactants that contain EO and PO groups together in the molecule can also be used according to the invention. Furthermore, a mixture of a (more highly) branched ethoxylated fatty alcohol and an unbranched ethoxylated fatty alcohol, such as a mixture of a C16-18 fatty alcohol with 7 EO and 2-propylheptanol with 7 EO are preferred. In particular, the aqueous dispersion according to the invention preferably contains a C12-18 fatty alcohol with 7 EO or a C13-15 oxo alcohol with 7 EO as the non-ionic surfactant.

A non-ionic surfactant may also be an amine oxide of formula $R^1R^2R^3NO$, wherein each of $R^1$, $R^2$ and $R^3$, independently of each other, are an optionally substituted $C_1$-$C_{30}$ hydrocarbon chain. Amine oxides that are particularly preferably used are those in which $R^1$ is C12-C18 alkyl and $R^2$ and $R^3$ are, independently of each other, $C_1$-$C_4$ alkyl, in particular $C_{12}$-$C_{18}$ alkyl dimethyl amine oxides. Examples of representatives of suitable amine oxides are N-coconut alkyl-N,N-dimethyl amine oxide, N-tallow alkyl -N,N-dihydroxyethyl amine oxide, myristyl-/cetyl dimethyl amine oxide or lauryl dimethyl amine oxide.

The aqueous dispersion according to the invention contains at least one surfactant, wherein the at least one surfactant is preferably an anionic or non-ionic surfactant or a mixture thereof; and/or the at least one surfactant comprises a fatty alcohol alkoxylate, preferably a linear C12-18 fatty alcohol alkoxylate, more preferably a linear C16-18 alcohol ethoxylate with 10 to 15 ethoxy units, most preferably Ceteareth-12; and/or wherein the at least one surfactant is present in 0.01 to 10 wt.-%, preferably 2 to 7 wt.-%, based on the solid content of the aqueous dispersion. A suitable non-ionic surfactant is commercially available under the trade name Eumulgin®B1 (Ceteareth-12) from BASF, Ludwigshafen, Germany. It has a hydroxyl value of 70-75.

According to the invention, the at least one surfactant B) is different from the compounds of component A), and the optional components C), D), and E) of the aqueous dispersion.

Besides cyclic olefin copolymers and surfactants, also co-resins can be contained in the aqueous dispersion according to the invention, preferably the co-resin is C) at least one adhesion promoter, more preferably the at least one adhesion promoter increases the adhesion of the resulting coating layer to the substrate, in particular with a polyethylene terephthalate or a polyolefinic substrate.

In a preferred embodiment, the aqueous dispersion according to the invention, comprises at least one adhesion promoter C), wherein
i) the at least one adhesion promoter has a hydroxyl number of 10 to 100 mg KOH/g, preferably 20 to 60 mg KOH/g; and/or
ii) the at least one adhesion promoter is selected from resins comprising hydroxyl groups, carboxylic, phosphonic and/or phosphoric acid groups, preferably having a sum of acid and hydroxyl value of more than 20 mg KOH/g, more preferably of more than 60 mg KOH/g; and/or
(iii) the at least one adhesion promoter comprises at least one polyester resin having an acid number of 5 to 75, preferably 20 to 30 mg KOH/g; and/or
the at least one adhesion promoter comprises at least one polyester resin, which has a glass transition temperature Tg of from 0 to 35° C., preferably 10to 25° C., measured according to DIN EN ISO 11357-1:2017-02, -2:2014-07, or -3:2018-07; and/or the at least one polyester resin is present in 0.5 to 20 wt.-%, preferably 1 to 7 wt.-%, based on the solid content of the aqueous dispersion.

The hydroxyl number as a measure of the number of free hydroxyl groups in the respectively defined reference set, for example per gram of the resin, can be experimentally determined, preferably by potentiometric titration. For this purpose, preferably a weighed amount of the reference material is dissolved in a reaction solution of 0.1 mol/L of phthalic anhydride in pyridine at 130° C. for 45 minutes and thereafter, 1.5 times the volume of the reaction solution of pyridine and then another 1.5 times of the initial volume of the reaction solution of deionized water ($\kappa$<$\mu$Scm$^{-1}$) were added. Preferably, the released amount of phthalic acid is titrated in this mixture by means of 1 M sodium hydroxide solution. Preferably, the potentiometric measurement is carried out using a combination electrode (LL Solvotrode® the Fa. Metrohm; reference electrolyte: 0.4 mol/l of tetraethylammonium bromide in ethylene glycol). The added amount of NaOH per gram of the reference amount in the inflection point of the potentiometric titration curve is preferably converted to a theoretical amount of added KOH that directly corresponds to the hydroxyl number.

In preferred embodiments, the adhesion promoter, preferably the polyester resin, suitable for the present invention, is prepared by reacting carboxylic acids (or their anhydrides, or their esters), preferably having effective acid functionalities of at least 2, and polyols, preferably having hydroxy functionalities of at least 2. The molar equivalents ratio of carboxylic acid groups to hydroxy groups of the reactants is selected such that the resulting polyester has hydroxyl functionality, and a desired molecular weight. Polyester resins, which can be included in the aqueous dispersion of the present invention, can be prepared by reacting cyclic carboxylic acid esters and polyols, preferably having hydroxy functionalities of at least 2.

Examples of multifunctional carboxylic acids useful in preparing adhesion promoters, preferably polyester resins, include, but are not limited to, benzene-1,2,4-tricarboxylic acid, phthalic acid, tetrahydrophthalic acid, hexahydrophthalic acid, endobicyclo-2,2,1,5-heptene-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, adipic acid, and sebacic acid.

Examples of polyols useful in preparing adhesion promoters, preferably polyester resins, include but are not limited to glycerin, trimethylolpropane, bis-trimethylolpropane, trimethylolethane, bis-trimethylolethane, trishydroxyethylisocyanurate, pentaerythritol, bis-pentaerythritol, ethylene glycol, propylene glycol, trimethylene glycol, 1,3-, 1,2- and 1,4-butanediols, heptanediol, hexanediol, octanediol, 2,2-bis(4-cyclohexanol)propane, neopentyl glycol, 2,2,3-trimethylpentane-1,3-diol, 1,4-dimethylolcyclohexane, and 2,2,4-trimethylpentane diol.

The adhesion promoter is preferably an aliphatic polyester resin. The aliphatic polyester resins are free of aromatic groups, and can optionally include carbon-carbon double bonds and/or carbon-carbon triple bonds. The aliphatic polyester resins are preferably prepared from monomers that are free of aromatic groups, and that are not modified after formation so as to include aromatic groups.

The adhesion promoter is preferably an aliphatic polyester and includes residues of at least one polyol having at least two hydroxyl groups, such as, at least one aliphatic polyol having at least two hydroxyl groups. Examples of aliphatic polyols having at least two hydroxyl groups, from which the polyester can be prepared, include, but are not limited to, glycerin, trimethylolpropane, bis-trimethylolpropane, trimethylolethane, bis-trimethylolethane, trishydroxyethylisocyanurate, pentaerythritol, bis-pentaerythritol, ethylene glycol, propylene glycol, trimethylene glycol, 1,3-, 1,2- and 1,4-butanediols, heptanediol, hexanediol, octanediol, 2,2-bis(4-cyclohexanol)propane, neopentyl glycol, 2,2,3-trimethylpentane-1,3-diol, 1,4- dimethylolcyclohexane, and 2,2,4-trimethylpentane diol.

In further embodiments, the adhesion promoter is an aliphatic polyester and each polyol residue thereof has at least three hydroxyl groups, preferably an aliphatic polyester and each polyol residue thereof is an aliphatic polyol residue having at least three hydroxyl groups. Examples of aliphatic polyols having at least three hydroxyl groups, from which the polyester can be prepared, including without being limited to, glycerin, trimethylolpropane, bis-trimethylolpropane, trimethylolethane, bis-trimethylolethane, trishydroxyethylisocyanurate, pentaerythritol, and bis-pentaerythritol.

The adhesion promoter preferably includes residues of at last one cyclic carboxylic acid ester. The polyester is an aliphatic polyester and includes residues of at least one cyclic carboxylic acid ester, such as at least one aliphatic cyclic carboxylic acid ester.

In some embodiments, cyclic carboxylic acid esters from which polyester addable to the aqueous dispersion of the present invention can be prepared, can be represented by the following formula (T-3):

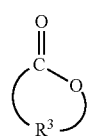

(T-3)

With reference to formula (T-3), and in accordance with some embodiments, $R^3$ is selected from divalent linear or branched C2-C20 alkyl, or divalent linear or branched C2-C10 alkyl, or divalent linear or branched C2-C5 alkyl, which can each optionally include at least one substituent selected from, hydroxyl, thiol, and halogen, such as, F, Cl, Br, and I.

In preferred embodiments, the adhesion promoter is an aliphatic polyester, and is prepared from (and correspondingly includes at least one residue of) a cyclic carboxylic acid ester, in which the cyclic carboxylic acid ester is selected from epsilon-caprolactone, delta-valerolactone, and combinations thereof.

In further preferred embodiments, the adhesion promoter, preferably the polyester resin, suitable for the aqueous dispersion of the present invention includes residues of at least one polyol having three hydroxyl groups and residues of at least one cyclic carboxylic acid ester. The polyester consists essentially of residues of at least one polyol having three hydroxyl groups, and residues of at least one cyclic carboxylic acid ester. The polyester preferably is an aliphatic polyester and consists essentially of residues of at least one aliphatic polyol having three hydroxyl groups, and residues of at least one aliphatic cyclic carboxylic acid ester. More preferred, the adhesion promoter is an aliphatic polyester and consists essentially of residues of at least one aliphatic polyol having three hydroxyl groups, and residues of at least one aliphatic cyclic carboxylic acid ester, and/or contains less than 1 wt.-%, or less than 0.5 wt.-%, or less than 0.1 wt.-%, or less than 0.01 wt.-%, based on total weight of the aliphatic polyester, of residues that are other than (i) residues of at least one aliphatic polyol having three hydroxyl groups, and (ii) residues of at least one aliphatic cyclic carboxylic acid ester. According to further preferred embodiments, the polyester is an aliphatic polyester and consists of, residues of at least one aliphatic polyol having three hydroxyl groups, and residues of at least one aliphatic cyclic carboxylic acid ester, and is free of residues that are other than (i) residues of at least one aliphatic polyol having three hydroxyl groups, and (ii) residues of at least one aliphatic cyclic carboxylic acid ester. According to the invention, the at least one adhesion promoter C) is different from the compounds of components A) and B), and the optional components D), and E) of the aqueous dispersion.

A commercially available, suitable adhesion promoter, preferably a polyester resin, is for example Tego AddBond LTW (5 wt.-%) from Evonik, Essen, Germany, with a glass transition temperature of approx. 20° C., according to DIN EN ISO 11357-2:2014-07, and an acid number of 20 to 30 mg KOH/g, according to DIN EN ISO 2114:2002-06. The hydroxyl number is approx. 30 mg KOH/g according to DIN EN ISO 4629-1:2016-12 or -2:2016-12.

In a preferred embodiment, the aqueous dispersion comprises or consists of A) at least one cyclic olefin copolymer; B) at least one surfactant; C) at least one adhesion promoter; and F) water.

In a further preferred embodiment, the aqueous dispersion comprises or consists of A) at least one cyclic olefin copolymer; B) at least one surfactant; C) at least one adhesion promoter; D) at least one film-forming resin; and F) water.

In a further preferred embodiment, the aqueous dispersion comprises or consists of A) at least one cyclic olefin copolymer; B) at least one surfactant; D) at least one film-forming resin; and F) water.

In a preferred embodiment, the aqueous dispersion comprises at least one film-forming resin, wherein
i) the at least one film forming resin forms after application a coherent film at temperatures below 100° C.; and/or
ii) the at least one film forming resin has a glass transition temperature of below 138° C., preferably below 78° C., most preferably below 65° C., measured according to DIN EN ISO 11357-1:2017-02, -2:2014-07, or -3:2018-07; and/or
iii) the at least one film forming resin comprises homo- and copolymers obtained by polymerizing at least one olefinic monomer with not more than 8 carbon atoms, preferably selected from ethylene, propylene, 1-butene, 2-butene, isobutene, 1,3-butadiene and 2-methylbuta-1,3-diene, preferably ethylene and/or propylene; and/or iv) the at least one film forming resin comprises copolymers obtained by polymerizing isobutylene with conjugated dienes, for example isoprene, preferably butyl rubber; and/or v) the at least one film forming resin comprises copolymers obtained by polymerizing at least one olefinic monomer, preferably acyclic, with not more than 5 carbon atoms, more preferably ethylene, propylene, 1-butene, 2-butene, isobutene, 1,3-butadiene and 2-methylbuta-1,3-diene, with at least one comonomer selected from □,□-unsaturated carboxylic acids, preferably cinnamic acid, crotonic acid, fumaric acid, itaconic acid, maleic acid, acrylic acid and methacrylic acid, wherein preferably the copolymer has an acid value below 60 mg KOH/g preferably at least 5 mg KOH/g, more preferably at least 10 mg KOH/g, even more preferably at least 20 mg KOH/g; and/or vi) the at least one film forming resin is present in 0.5 to 40 wt.-%, preferably 5 to 20 wt.-%, based on solid content of the dispersion.

Preferably, the film-forming resin has an acid value of at least 5 mg KOH/g to ensure film-forming together with compound A). However, the film-forming resin has preferably an acid value below 60 mg KOH/g to support the stable dispersion of compound A.

According to the invention, the at least one film-forming resin D) is different from the compounds of components A) and B), and the optional components C) and E) of the aqueous dispersion.

In a preferred embodiment, the aqueous dispersion comprises or consists of A) at least one cyclic olefin copolymer; B) at least one surfactant; C) at least one adhesion promoter; D) at least one film-forming resin; E) at least one additive; and F) water.

In a further preferred embodiment, the aqueous dispersion comprises or consists of A) at least one cyclic olefin copolymer; B) at least one surfactant; D) at least one film-forming resin; E) at least one additive; and F) water.

In a further preferred embodiment, the aqueous dispersion comprises or consists of A) at least one cyclic olefin copolymer; B) at least one surfactant; C) at least one adhesion promoter; E) at least one additive; and F) water.

In a further preferred embodiment, the aqueous dispersion comprises or consists of A) at least one cyclic olefin copolymer; B) at least one surfactant; E) at least one additive; and F) water.

In a preferred embodiment, the aqueous dispersion comprises at least one additive, wherein i) the at least one additive is selected from the group comprising of a biocide, organic solvent, plasticizer, slip agent, antiblocking agent, pH adjusting agent, dye, pigment, natural oil, synthetic oil, wax, and/or organic or inorganic filler, preferably a biocide and/or an organic solvent; and/or ii) the at least one additive is present in 0.0001 to 20 wt.-%, preferably 0.01 to 15 wt.-%, based on the total weight of the aqueous dispersion.

According to the invention, also minor amounts, preferably amounts below 1 wt.-%, more preferably below 0.1 wt.-%, more preferably below 0.01 wt.-% of optional impurities and/or optional reaction or side products, which can be formed in the aqueous dispersion, fall under the term "additive".

Preferred biocidal compounds, which can be added to the aqueous dispersion according to the invention include triclosan, compounds based on heavy metals, especially silver, on inorganic carriers such as zeolites, hydroxyapatite, zinc oxide, titanium dioxide, zirconium phosphate, isothiazolones, benzisothiazolin-3-one derivatives, 10,10'-oxybisphenoxyarsine, isothiazolines, zinc pyrithione, and folpet (trichloromethyl thio-phthalimide). The addition of biocides may improve the biocidal activity of coating layers containing known biocidal compounds. It is envisaged that biocidal compounds other than those listed above may also be effectively used in the aqueous dispersion of the present invention.

The term "biocide" refers to compounds with biostatic activity, i.e. where the proliferation of microbiological species is reduced or eliminated in addition to true biocidal activity where microbiological species are killed. According to the invention the term also includes activity against fungi, bacteria and other microbiological species.

Suitable organic solvents, which can be added to the aqueous dispersion according to the invention are aromatic solvents, e.g. benzaldehyde, toluene, benzene, and chlorinated solvents, non-polar organic solvents, e.g. C5-C12 hydrocarbons such as pentane, hexane, heptane and the like, gasoline (petrol ether), norbornene, oleic acid, and mixtures thereof. Suitable organic solvents also include mixtures of aromatic solvents and/or non-polar organic solvents with polar organic solvents, e.g. ethanol, methanol, butanol, isopropanol, acetone, butanone. A preferred mixture is toluene and isopropanol, in particular in amounts of 9:1.

According to the invention, the at least one additive E) is different from the compounds of components A) and B), and the optional components C) and D) of the aqueous dispersion.

In a preferred embodiment, the aqueous dispersion has a solid content of 20 to 60 wt.-%, preferably 40 to 55 wt.-%, more preferably 45 to 50 wt.-%.

According to aspect 2, the invention relates to a method of manufacturing an aqueous dispersion, comprising or consisting of the steps:

(i) dissolving A), the at least one cyclic olefin copolymer in a suitable solvent, and optionally adding B), the at least one surfactant, and/or optionally C), the at least one adhesion promoter, and/or optionally D), the at least one film forming resin, and/or optionally E), the at least one additive;

(ii) optionally mixing an aqueous phase with B), the at least one surfactant, preferably an anionic and/or non-ionic surfactant, if B) has not been added in step (i), preferably under heating to temperatures between 50 and 100 ° C., more preferably between 65 and 80 ° C., most preferably between 70 and 75 ° C.;

(iii) mixing the solution of step (i) and the aqueous phase, which optionally contains B), the at least one surfactant, if B) has not been added in step (i), under high shear, preferably in a new vessel, more preferably in a high shear mixer, preferably for 0.1 to 10 minutes, more preferably for 0.5 to 5 minutes, most preferably for 0.7 to 2 minutes; and (iv) condensing the used solvents, preferably under vacuum, more preferably at 50 to 500 mbar, more preferably at 150 to 450 mbar, most preferably at 200 to 400 mbar.

Suitable solvents for methods for manufacturing aqueous dispersions according to the present invention are without being limited to it, e.g. polar organic solvents, aromatic and/or non-polar organic solvents, preferably ethanol, methanol, butanol, isopropanol, acetone, butanone, benzaldehyde, toluene, benzene, chlorinated solvents, C5 to C12 linear or branched hydrocarbons, e.g. pentane, hexane, heptane, or octane, gasoline (petrol ether), norbornene, oleic acid, and mixtures thereof. Aromatic and non-polar organic solvents are preferred.

In a preferred embodiment, the solvent is a mixture of toluene and isopropanol.

Preferably, the shearing of step (iii) is conducted in a high shear mixer, more preferably in a batch high shear mixer or in an inline high-shear mixer. In a preferred embodiment, the impeller speed of the high shear mixer is 100 to 1500 rpm, more preferably 200 to 1000 rpm.

In a preferred embodiment, the solution of step (i) and the aqueous phase, which is optionally mixed with B), the at least one surfactant, if B) has not been added in step (i), are added simultaneously, preferably in a new vessel.

In another preferred embodiment, the solution of step (i) is firstly added into a new reaction vessel and afterwards the aqueous phase, which is optionally mixed with B), the at least one surfactant, if B) has not been added in step (i), is added stepwise under high shear.

In another preferred embodiment, the aqueous phase, which is optionally mixed with B), the at least one surfactant, if B) has not been added in step (i), is firstly added into a new reaction vessel and afterwards the solution of step (i) is added stepwise under high shear.

A suitable high shear mixer is for example Kady Mill LT2000, commercially available from the company Kady International, Scarborough.

In a preferred embodiment, the addition of the solution of step (i) and the aqueous phase, which is optionally mixed with B), the at least one surfactant, if B) has not been added in step (i), are added automatically into the new reaction vessel, preferably within a continuous process, more preferably by using an inline high-shear mixer.

According to aspect 3, a method of manufacturing an aqueous dispersion according to the invention is claimed, comprising or consisting of the steps:
(i) feeding an extruder with A), the at least one cyclic olefin copolymer, optionally with B), the at least one surfactant, and/or optionally with C), the at least one adhesion promoter, and/or optionally with D) the at least one film forming resin, and/or optionally with E), the at least one additive;
(ii) adding water, which is optionally mixed with B), the at least one surfactant, if B) has not been added in step (i) and/or optionally with C), the at least one adhesion promoter, if C) is present and has not been added in step (i) and/or optionally with D), the at least one film forming resin, if D) is present and has not been added in step (i), and/or optionally with (E) the at least one additive, if E) is present and has not been added in step (i), into the extruder, preferably into the high shear screw region of the extruder, more preferably during the extrusion process; and
(iii) diverting the aqueous dispersion resulting from step (ii) from the extruder.

In a preferred embodiment, the screw speed of the extruder is 100 to 1500 rpm, more preferably 200 to 1000 rpm.

In another preferred embodiment, the water or aqueous phase of step (ii) is added stepwise under high shear, preferably 100 to 1500 rpm, more preferably 200 to 1000 rpm.

In a preferred embodiment, in step (i), the extruder is fed with A), the at least one cyclic olefin copolymer and optionally with B), the at least one surfactant, preferably with ethylene acrylic acid (EAA). Afterwards, in step (ii) the water is added to the extruder, wherein the water is optionally mixed with B), the at least one surfactant, preferably with ethylene acrylic acid (EAA), if B) has not been added in step (i), and/or optionally with C), the at least one adhesion promoter, and/or optionally with D), the at least one film-forming resin, and/or optionally with E), the at least one additive.

According to aspect 4, a method of manufacturing an aqueous dispersion according to the invention is claimed, comprising or consisting of the steps:
(i) melting, preferably under stirring or mixing, A), the at least one cyclic olefin copolymer, B), the at least one surfactant, optionally C), the at least one adhesion promoter, and/or optionally D) the at least one film forming resin, and/or optionally E), the at least one additive;
(ii) transferring the mixture of step (i) in a reaction chamber, preferably over an inlet, more preferably under high pressure of 10 to 900 bar;
(iii) simultaneously with step (ii) transferring water having a temperature above 100° C., but preferably less than 200° C., in the reaction chamber, preferably over a second inlet, more preferably under high pressure of 10 to 900 bar;
(iv) delivering the mixture of step (ii) and the water of step (iii) simultaneously into a carrier gas, e.g. $N_2$, $H_2$ or argon, in the reaction chamber, preferably with a jet velocity up to 300 m/s, more preferably with a mixing time of the mixture of step (ii) and the water of step (iii) from <0.1 ms;
(v) diverting the mixture resulting from step (iv) from the reaction chamber.

In a preferred embodiment of aspect 4 the method is performed in a MicroJet reactor (MJR). Suitable devices are commercially available from Nanosaar, Starnberg, Germany.

In a preferred embodiment, the aqueous dispersion according to the invention is used to form a copolymer coating on a substrate.

Therefore, in a fifth aspect, the invention refers to an article, which comprises at least one substrate and at least one coating layer, wherein the article is obtainable by
applying the aqueous dispersion according to the invention onto the substrate, preferably via a film coater, more preferably under vacuum; and
then drying the article, whereby the coating layer is obtained, preferably by heating.

In a preferred embodiment,
i) the substrate is a polyethylene terephthalate or a polyolefinic substrate, preferably poly ethylene terephthalate or oriented polypropylene; and/or
ii) the substrate is a flexible substrate, preferably a film; and/or
iii) the obtained coating layer has a coating thickness of 0.1 to 15 $g/m^2$, preferably 5 to 10 $g/m^2$, more preferably 7 to 9.5 $g/m^2$; and/or
iv) the article has a MVTR at 38° C. and 90% RH of 7 to 60 $g/(m^2 \cdot day)$, preferably 12 to 50 $g/(m^2 \cdot day)$.

Preferably, the aqueous dispersion is applied upon the substrate by using an (automatic) film coater, more preferably in combination with a vacuum plate as support. A suitable automatic film coater is for example commercially available from Elcometer Limited, Manchester, under the trade name Elcometer 4340. Additionally, a wire bar coater or a doctor blade, e.g., in rotogravure printing or roll-to-roll processes, can be used to apply the aqueous dispersion according to the invention onto the substrate.

In a preferred embodiment, conventional drying methods such as thermal radiation, are applied, preferably in an oven, preferably at 50 to 200° C., e.g. at 140° C., preferably for 0.5 minutes to 120 minutes, more preferably for 1 minute to 10 minutes, most preferably for 5 minutes.

Preferably according to the invention, the term "vacuum" is defined to be air pressure below 500 mbar, more preferably below 450 mbar, more preferably below 400 mbar, more preferably below 300 mbar, more preferably below 200 mbar, more preferably below 100 mbar, most preferably below 50 mbar, if not stated otherwise.

In a sixth aspect, the invention relates to a use of the aqueous dispersion according to the invention for coating a substrate, preferably a polyethylene terephthalate or polyolefinic substrate. Polyolefinic substrates are preferably made of polyethylene, and/or polypropylene including oriented and non-oriented version thereof as well as chlorinated or fluorinated version thereof.

In a preferred embodiment, the aqueous dispersion is used to form a coating layer, which is a thermoforming film or sheet, more preferably suitable for food packaging, e.g. for multilayer pouches, multilayer twist / fold wrap films for candy, and PE-based forming webs, packages, e.g. linear tear pouches, high performance multilayer polyolefin shrink films and bubble wrap films for protective packaging, zippers for food and consumer goods, or packaging for medicines and devises, e.g. for blister films, medical forming webs for medical device, transdermal patches and medical trays.

In a further preferred embodiment, the aqueous dispersion according to the invention provides a coating on a substrate, preferably on a polyethylene terephthalate or polyolefinic substrate, more preferably on a polyethylene terephthalate or polyolefinic packaging. Preferably, the coating, obtainable from the aqueous dispersion according to the invention increases the gas barrier properties of the substrate. Furthermore, the coating produced from the aqueous dispersion according to the invention improves the adhesion of the coating to the substrate, preferably without altering the moisture barrier properties.

All features described for the aqueous solution according to the invention also apply to the claimed manufacturing methods, to the claimed article, and to the claimed use, and vice versa.

EXAMPLES

Example 1

Dispersion Preparation:

The procedure consists of three steps. In the first step, the cyclic olefin copolymer resin (Topas 9506F-04 from Topas GmbH, 7 wt.-%) was added together with a polyester resin (Tego AddBond LTW from Evonik, 5 wt.-%) into a three-neck round-bottom glass, followed by the addition of a mixture of solvents (toluene : isopropanol; 9:1 ratio). The round-bottom glass was connected to a reflux system and heated under continuous stirring, bringing it to boiling with the help of a heating mantle. The reactants needed to be added stepwise to avoid possible swelling of the polyolefin and thus preventing blocking of the stirring blade. The mixture was stirred until complete solubilisation was achieved, to obtain a crude. The size of the round bottom glass depends on the total volume of the preparation.

In the second step, the water-phase was prepared by adding an anionic surfactant (Texapon K 12 P from BASF, 0.3 wt.-%) into a beaker together with a non-ionic emulsifier (Eumulgin B1 from BASF, 0.5 wt.-%) and mixed with the corresponding amount of water. The beaker was heated at 70 to 75 °C. using a magnetic hot plate under continuous stirring.

In the third step, the lacquer-phase was transferred into a high shear mixer (Kady Mill LT2000) followed by the addition of the aqueous phase. Finally, the mixture was dispersed using high shear for 1 minute. The crude was then transferred again into the round-bottom glass and attached to the distillation set-up by connecting it to a Claisen bridge. The distillation of the solvent was carried out under vacuum (200 -400 mbar, depending on the foaming degree).

Coating Preparation:

Once the dispersion is done, a coating was made of it by using a film coater (Elcometer 4340) provided of a vacuum plate. The desired substrate (polyethylene terephthalate (PET) or oriented polypropylene (OPP)) was placed on the plate, using vacuum to prevent any possible wrinkles during coating application. The dispersion was thus applied on the substrate with the help of a wire bar coater or a doctor blade, and a homogeneous film was produced. The coating thickness can be adjusted by appropriately selecting size wire bar or doctor blade. Finally, the coating was thermally dried in the oven for 5 minutes at 140° C.

Moisture Vapour Transmission Rate (MVTR) Measurement:

Once the film was dried, two pieces are cut into the appropriate form to place them into the Mocon cells (Permatran-W 3/34 from Mocon Inc.). The films were placed with the coating facing the dry side and its MVTR was continuously measured at 38° C. and 90% RH until a plateau is achieved. Table 1 illustrates results regarding thickness and MVTR of the final coating on PET.

TABLE 1

Thickness and MVTR of the final coating on PET.

| Substrate | Drying conditions [° C.; min] | Coating thickness [g/m$^2$] | MVTR at 38° C. and 90% RH [g/(m$^2$ day)] |
|---|---|---|---|
| PET | — | — | 44-48 |
| PET | 120; 5 | 8-9 | 19.7 |
| PET | 140; 5 | 8-9 | 17.9 |
| PET | 140; 5 | 8-9 | 14.1 |

What is claimed is:

1. An aqueous dispersion, comprising components:
   A) at least one cyclic olefin copolymer;
   B) at least one surfactant, different from A);
   C) at least one adhesion promoter, different from A) and B), present in an amount of 0.5 to 20 wt-%, based on solid content of the aqueous dispersion. and selected from resins comprising hydroxyl groups, carboxylic, phosphonic, phosphoric acid groups and combinations thereof;
   D) optionally at least one film forming resin, different from A), B) and C);
   E) optionally at least one additive, different from A), B), C) and D); and
   F) water.

2. The aqueous dispersion according to claim 1, wherein Component A) the at least one cyclic olefin copolymer comprises a C5 to C12 cycloalkene copolymerized with at least one C2 to C10 alkylene, the copolymer being present in an amount of 5 to 99 wt .- %, based on solid content of the aqueous dispersion and having an average particle size as a D50 value of 50 to 500 nm measured via dynamic light scattering.

3. The aqueous dispersion according to claim 2, wherein Component B) the at least one surfactant is an anionic or non-ionic surfactant or a mixture thereof present in an amount of 0.01 to 10 wt .- %, based on the solid content of the aqueous dispersion.

4. The aqueous dispersion according to claim 3, wherein Component B) the at least one surfactant comprises at least one of an alkyl sulfate, a fatty alcohol alkoxylate, and a copolymer of at least one olefinic monomer and at least one comonomer selected from a α,β-unsaturated carboxylic acids.

5. The aqueous dispersion according to claim 1, wherein Component C) the at least one adhesion promoter is present in an amount of 1 to 7 wt .- % based on the solid content of the aqueous dispersion, and comprises at least one polyester resin, which has an acid number of 5 to 75 mg KOH/g and a glass transition temperature Tg of from 0 to 35° C.

6. The aqueous dispersion according to claim 1, wherein Component D) the at least one film forming resin is present in 0.5 to 40 wt .- % based on the solid content of the aqueous dispersion, and comprises one or more of:
    i) a homopolymer of an olefinic monomer having not more than 8 carbon atoms;
    ii) a copolymer of at least two olefinic monomers having not more than 8 carbon atoms;
    iii) copolymers obtained by polymerizing isobutylene with conjugated dienes;
    iv) copolymers obtained by polymerizing at least one olefinic monomer having not more than 5 carbon atoms, with at least one co-monomer selected from α,β-unsaturated carboxylic acids, wherein the copolymer has an acid value below 60 mg KOH/g and at least 5 mg KOH/g.

7. The aqueous dispersion according to claim 1, wherein the optional Component E) the at least one additive has been added to the aqueous dispersion in an amount of 0,0001 to 20 wt .- % based on total weight of the aqueous dispersion, and is selected from a biocide, an organic solvent, a plasticizer, a slip agent, an antiblocking agent, a pH adjusting agent, a dye, a pigment, a natural oil, a synthetic oil, a wax, an organic filler, an inorganic filler and combinations thereof.

8. An aqueous dispersion. comprising components:
    A) at least one cyclic olefin copolymer:
    B) at least one surfactant, different from A);
    C) optionally at least one adhesion promoter, different from A) and B);
    D) optionally at least one film forming resin. different from A), B) and C);
    E) optionally at least one additive, different from A), B), C) and D); and
    F) water;
wherein Component A) the at least one cyclic olefin copolymer is a C5 to C12 cycloalkene copolymerized with at least one of ethylene, propylene, butylene, hexylene and octylene and present in an amount of 50-95 wt .- %, Component B) the at least one surfactant is present in an amount of 2-7 wt .- %, and comprises a mixture of an anionic surfactant and a non-ionic emulsifier; and Component C) the at least one adhesion promoter is present in an amount of 1-7 wt .- % and comprises at least one polyester resin; all amounts being based on solid content of the aqueous dispersion.

9. A method of manufacturing an aqueous dispersion according to claim 1 comprising steps of:
    (i) dissolving A), the at least one cyclic olefin copolymer in solvent, optionally adding one or more of B), C), D), or E), forming a solution;
    (ii) providing an aqueous phase and, if B) was not added in step (i), mixing B) the at least one surfactant into the aqueous phase at temperatures between 50 and 100° C.;
    (iii) mixing the solution of step (i) and the aqueous phase of (ii), under high shear for 0.1 to 10 minutes; and
    (iv) distilling off the solvent.

10. A method of manufacturing an aqueous dispersion according to claim 1 comprising steps of:
    (i) feeding an extruder with A) the at least one cyclic olefin copolymer, and optionally with one or more of B), C), D), or E);
    (ii) adding water, which is optionally mixed with one or more of B), C), D), or E) that were not added in step (i), into the extruder during the extrusion process; and
    (iii) diverting the aqueous dispersion resulting from step (ii) from the extruder.

11. A method of manufacturing an aqueous dispersion according to claim 1 comprising steps:
    (i) melting A) the at least one cyclic olefin copolymer and B) the at least one surfactant; optionally with one or more of C), D), or E), forming a mixture;
    (ii) transferring the mixture of step (i) to a reaction chamber, optionally under pressure of 10 to 900 bar;
    (iii) simultaneously with step (ii), transferring water having a temperature greater than 100° C. , but less than 200° C. , to the reaction chamber, optionally under pressure of 10 to 900 bar;
    (iv) delivering the mixture of step (ii) and the water of step (iii) simultaneously into a carrier gas in the reaction chamber, with a jet velocity up to 300 m/s; and
    (v) diverting the mixture resulting from step (iv) from the reaction chamber.

12. An article of manufacture comprising at least one substrate and at least one coating layer deposited on the at least one substrate by applying the aqueous dispersion according to claim 1 onto the at least one substrate, optionally via a film coater under vacuum; and then drying the aqueous dispersion, optionally by heating thereby forming the at least one coating layer with adhesion to the at least one substrate and providing the article with a moisture vapor transmission rate ("MVTR") at 38° C. and 90% RH of 7 to 60 g/(m$^2$·day).

13. The article according to claim 12, wherein the at least one substrate is polyethylene terephthalate or oriented polypropylene, the at least one coating layer has a thickness of 0.1 to 15 g/m$^2$ and the article has a moisture vapor transmission rate ("MVTR") at 38° C. and 90% RH of 12 to 50 g/(m$^2$·day).

14. A method of improving moisture vapor transmission rate ("MVTR") of a polyethylene terephthalate or polyolefinic substrate, comprising:
    a. applying the aqueous dispersion according to claim 1 onto a polyethylene terephthalate or polyolefinic substrate, optionally a flexible film substrate, under vacuum as a homogenous film; and
    b. drying the homogenous film on the polyethylene terephthalate or polyolefinic substrate by heating to form a coating layer having a thickness of 5 to 10 g/m$^2$ and an MVTR of 12 to 50 g/(m$^2$·day) at 38° C. and 90% RH.

* * * * *